United States Patent [19]

Vitale et al.

[11] 4,422,169

[45] Dec. 20, 1983

[54] LENS ASSEMBLY FOR A VIDEO RECORDER-PLAYBACK MACHINE

[75] Inventors: George Vitale; Richard L. Wilkinson, both of Torrance, Calif.

[73] Assignee: Discovision Associates, Costa Mesa, Calif.

[21] Appl. No.: 198,697

[22] Filed: Oct. 20, 1980

[51] Int. Cl.$^3$ .............................................. G11B 7/00
[52] U.S. Cl. ..................................... 369/45; 369/111; 369/72; 350/255; 384/114
[58] Field of Search ................. 369/450, 111, 112, 72; 360/102, 103; 358/128.5, 342; 350/252, 255; 308/9, DIG. 1; 384/114, 118, 111

[56] References Cited

U.S. PATENT DOCUMENTS

| 3,081,682 | 3/1963 | Khoury | 350/255 |
| 3,154,627 | 10/1964 | Wallis | 350/310 |
| 4,006,294 | 2/1977 | Canino | 369/100 |
| 4,021,101 | 5/1977 | Camerik | 369/45 |
| 4,106,057 | 8/1978 | Van Vroenhoven | 369/121 |
| 4,349,244 | 9/1982 | Hellriegel | 350/255 |

FOREIGN PATENT DOCUMENTS

| 2209981 | 7/1974 | France | 360/102 |
| 1246416 | 9/1971 | United Kingdom | 358/225 |
| 710069 | 1/1980 | U.S.S.R. | 350/255 |

OTHER PUBLICATIONS

Patent Abstract of Japan, vol. 2, No. 2, 1/13/79, p. 62 E83, JP-A-53129605.

*Primary Examiner*—Alan Faber
*Attorney, Agent, or Firm*—Ronald J. Clark

[57] ABSTRACT

A lens assembly is positionally adjusted for precisely focusing a light beam upon a video information disc in a video recorder-playback machine. The lens assembly includes a focusing lens supported on an air bearing within an assembly housing for movement toward and away from the disc. A current conducting coil is movable with the focusing lens and is adapted to receive an electrical current indicative of instantaneous focusing error of the light beam upon the disc. A fixed magnetic field formed by a permanent magnet mounted on the housing between opposite pole pieces comprising portions of the housing is magnetically coupled with the coil whereby variations in the current result in adjustment of the position of the focusing lens with respect to the disc to correct the focusing error.

23 Claims, 5 Drawing Figures

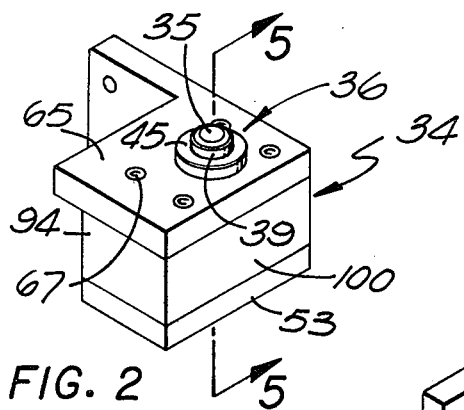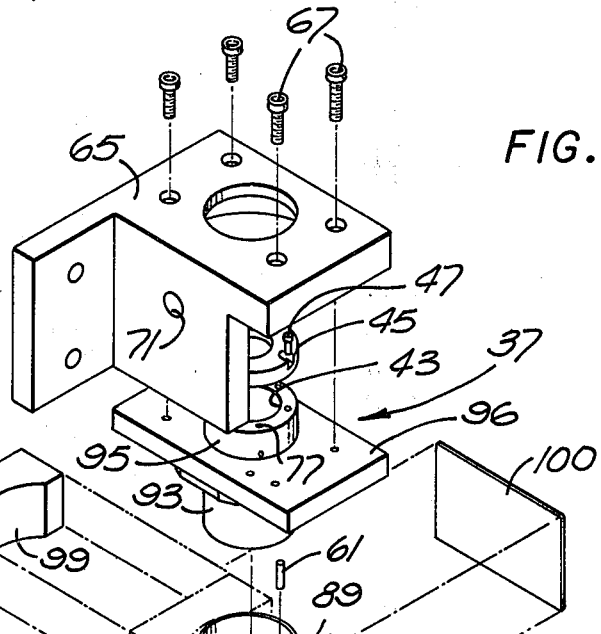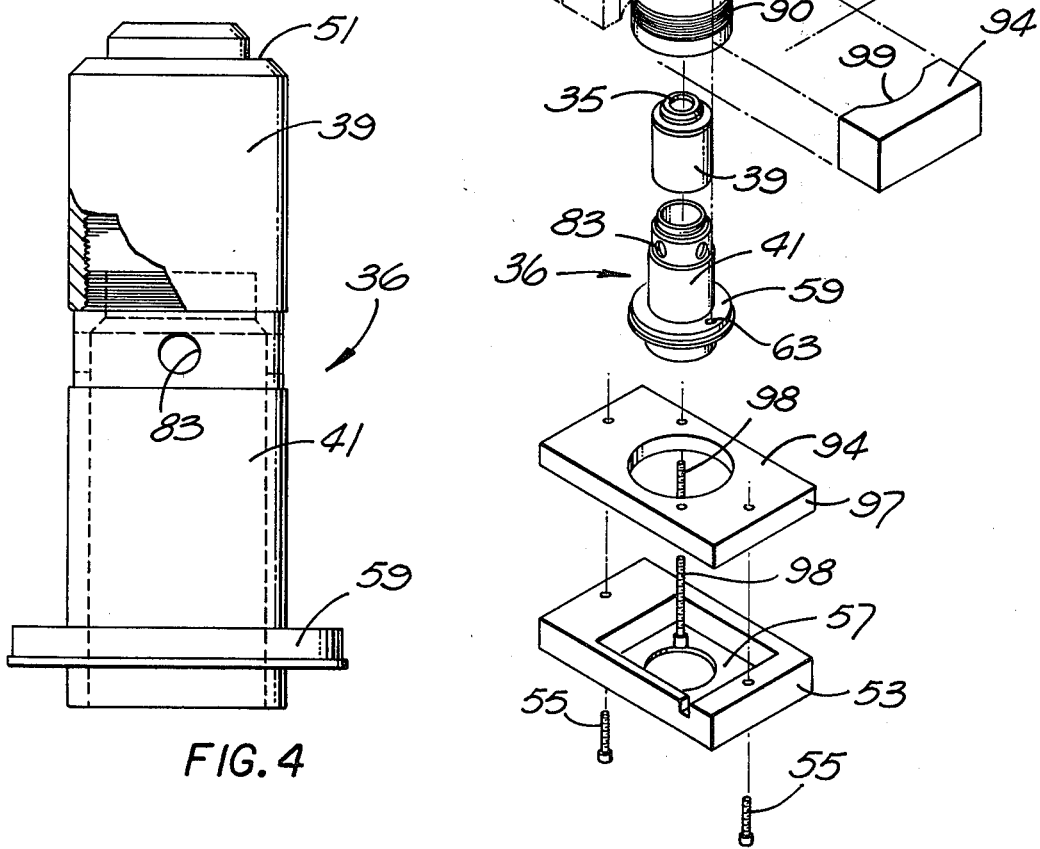

LENS ASSEMBLY FOR A VIDEO RECORDER-PLAYBACK MACHINE

BACKGROUND OF THE INVENTION

This invention relates to improvements in video recorder-playback machines, and more specfically, to a lens assembly for a video recorder-playback machine, including improved means for adjusting the focus of an optical signal upon a video information disc.

Video recorder-playback machines in general are known in the art and include appropriate means for recording and/or playing back a video information signal utilizing a selected medium for storage of the signal. For example, in one type of machine, the video signal is recorded magnetically for storage and/or retrieval upon a length of so-called video tape. In another type of system, the video signal is recorded upon an information disc for retrieval by means of a stylus, in a manner generally analogous to that of sound reproduction from phonographic records. In still another type of system, the video signal is used to frequency modulate a beam of amplified light, such as a laser beam, with sufficient power for physically altering the surface characteristics of a light sensitive coating on a video information disc and thereby record the signal upon the disc. During playback, a lower power light beam is reflected from the disc and the resulting signal is demodulated to reproduced the recorded signal. In all of these types of systems, the video information signal can be combined with an appropriate audio signal for either recording or playback purposes to yield a composite audio-video signal of the type commonly used for television transmissions and the like. For convenience, however, the signal will be referred to herein as a video information signal.

Video recorder-playback machines utilizing amplified light beams for recording and playback purposes offer significant advantages in that all physical contact of the recording and playback elements with the storage medium, namely, the information disc, is avoided. This prevents wear and deterioration of the machine elements and the disc, resulting in a high quality stored video signal which can be played back repeatably over a long period of time with unimpaired video resolution.

In video recorder-playback machines using amplified light beams for signal recording and playback, the recording and playback optical beams are focused upon the video information disc by a focusing lens which traverses the span of the disc in a radial direction simultaneously with relatively high speed rotation of the disc. In this manner, a spiral pattern of closely spaced tracks is formed on the disc to represent the video information. For maximum storage capacity for each disc, together with maximum signal resolution, it is desirable to form the information tracks on the disc to have a narrow width on the order of about 0.5 microns, and a narrow center-to-center spacing between radially adjacent tracks in the spiraling pattern on the order of about 1.5 microns. Accordingly, for high quality signal resolution without cross talk between adjacent tracks during recording and/or playback operation, it is imperative that the amplified light beams are accurately and precisely focused at all times upon the video information disc. However, video information discs typically exhibit surface imperfections resulting from scratching, pitting, warping, and the like. These surface imperfections create relatively slight variations during disc rotation in the distance between the focusing lens and the disc to impair precise and consistent focusing of the light beams on the disc.

A variety of systems have been proposed for positionally adjusting the focusing lens in response to surface imperfections in the disc in an effort to maintain a precise focus of the optical beams upon the disc. Some of these systems comprise servo mechanisms wherein the focusing lens is positionally adjusted by means of mechanical linkage arrangements. See, for example, U.S. Pat. No. 3,829,622. However, these mechanical systems are subject to vibration and wear during operation resulting in a decrease in system accuracy over time. Other systems have proposed fluid or hydrodynamic pressure responsive devices for adjusting the position of the focusing lens, such as those shown and described in U.S. Pat. Nos. 3,894,180; 3,914,541; 3,947,888; and 4,006,294. However, these systems are relatively complex in design and are not easily packaged into an inexpensive and compact unit for use with record or playback machines on a commerical scale. Still other systems have suggested the use of electromagnetic devices for controlling the position of a focusing lens supported for movement within an air bearing. See, for example, U.S. Pat. No. 3,530,258. However, these systems also have been relatively complex in design and operation making them difficult to package in a compact and inexpensive unit for large scale commercial production.

The present invention overcomes the problems and disadvantages of the prior art by providing an improved lens assembly for a video recorder-playback machine. The improved lens assembly includes a simplified, compact, and relatively inexpensive arrangement for electromagnetic adjustment of the position of a focusing lens carried within an air bearing.

SUMMARY OF THE INVENTION

In accordance with the invention, a lens assembly focuses an optical beam upon the surface of a video information disc in a video recorder-playback machine for recording and/or playback of video information from the disc. The lens assembly is mounted upon an optics carriage adapted to radially traverse the video information disc concurrently with disc rotation, and includes a focusing lens for precisely focusing the optical beam upon the disc along a spiral pattern of closely spaced information tracks on the disc. The focusing lens is carried within a lens assembly housing for relatively vibration-free movement toward and away from the disc in response to variations in the distance between the focusing lens and the disc for maintaining the optical beam in precise focus upon the disc.

The focusing lens is mounted within a generally cylindrical-shaped objective lens unit received for sliding movement toward and away from the disc within a generally cylindrical bore formed within the lens assembly housing. This assembly housing includes a network of internal flow passages for communicating a flow of a fluid such as air under pressure from a pressure port on the housing to the sliding interface between the objective lens unit and the housing. In this manner, the objective lens unit is supported for positional adjustment upon an air bearing for movement toward and away from the disc.

The objective lens unit includes a radially outwardly projecting flange which provides support for a cylindrical sleeve having a current conducting coil wound thereon. This coil is positioned concentrically within an annular air gap defined by annular, circumferentially spaced pole pieces formed by the lens assembly housing. These pole pieces provide a high density flux path for a magnetic field created by one or more permanent magnets mounted on the assembly housing. Accordingly, the assembly housing defines both an air bearing for the objective lens unit and magnetizable pole pieces forming an air gap within a magnetic field in which the current conducting coil is positioned.

An electrical current is provided to the coil wherein the current is representative of the instantaneous distance between the focusing lens and the video information disc. The magnitude of the current thus also represents the error in focus of the optical beam upon the disc, and is varied in response to variations in the lens-to-disc distance. This variation in current within the magnetic field results in corresponding variations of the position of the coil within the air gap. Thus, the objective lens unit, including the focusing lens, moves toward or away from the disc along with the coil to adjust continuously the actual lens-to-disc distance, and thereby maintain a precise focus of the optical beam upon the video information disc.

Other features and advantages of the present invention, will become apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 2 is an enlarged perspective view illustrating the lens assembly of this invention for use in the recorder-playback machine;

FIG. 3 is an enlarged perspective view in exploded form illustrating the components of the lens assembly of FIG. 2;

FIG. 4 is a vertical elevation view of a portion of the lens assembly, with portions broken away.

DETAILED DESCRIPTION OF THE PREFERRED EMBODIMENT

Figure 1:
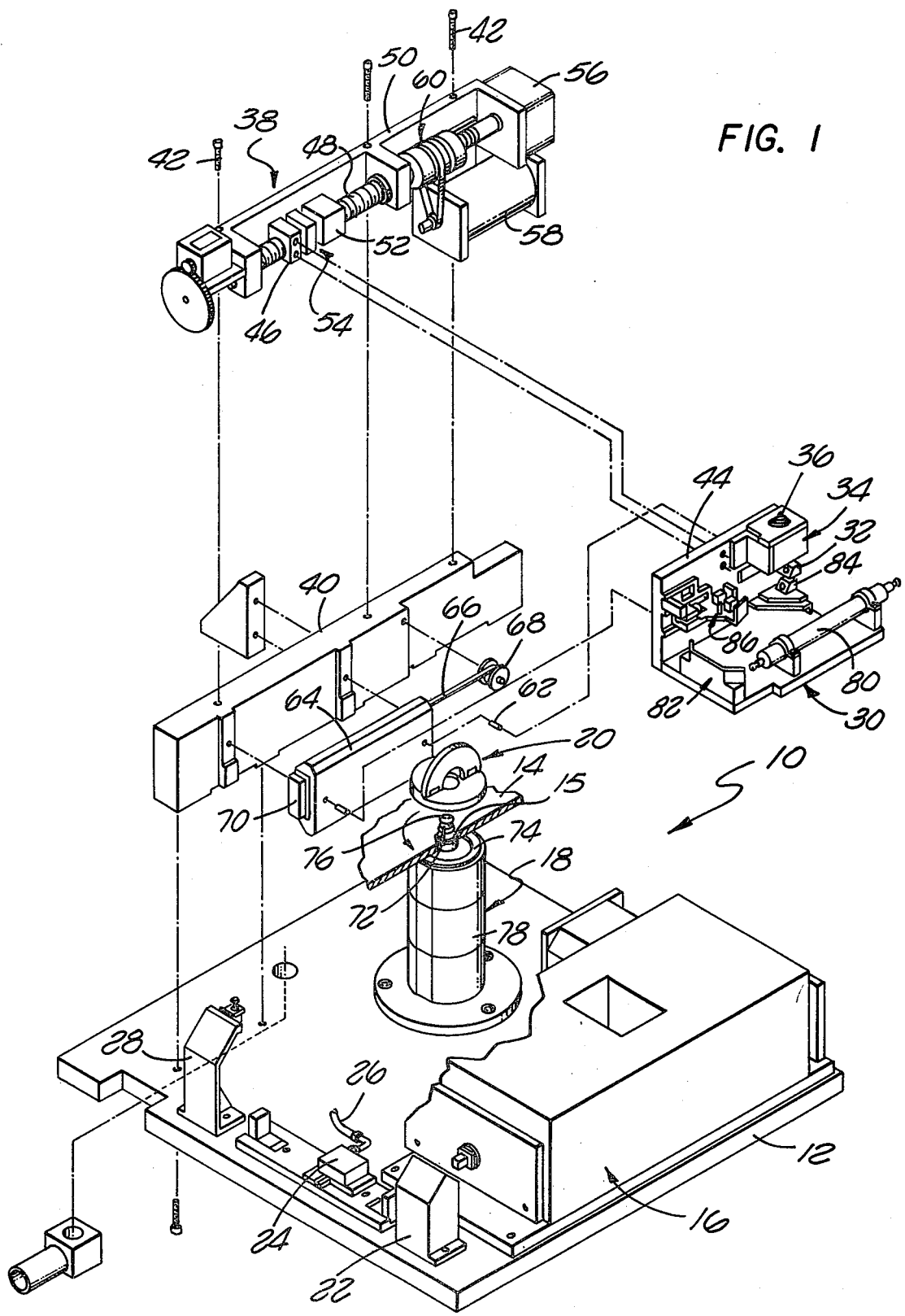
FIG. 1 is a fragmented perspective view illustrating, in partially exploded form, a video recorder-playback machine.

As shown in the exemplary drawings, the present invention is embodied in a video recorder-playback machine 10 having suitable optical and electronic elements for recording and playback of video information from a video information disc 14. The information disc 14 is removably supported within the machine upon a spindle assembly 18 for controlled and accurate high speed rotation of the disc, and a clamp assembly 20 operates to clamp the disc 14 is a precisely centered position upon the spindle assembly 18 to prevent slippage of the disc during rotation. A lens assembly 34 of this invention is provided for focusing optical beams precisely upon the disc 14 for appropriate recording and/or playback of video information.

The machine 10, including the lens assembly 34 of this invention, comprises an improvement over the prior art in that the lens assembly 34 is designed for consistent and precise focusing of optical beams upon the information disc 14. More specifically, the lens assembly 34 includes means responsive to the instantaneous distance between the disc and optical focusing elements within the lens assembly 34 for positionally adjusting the focusing elements to maintain the optical beams in precise focus upon the disc. The invention is thus responsive to imperfections in the disc surface resulting from scratching, pitting, warping, or the like for consistently maintaining a proper focus of the signals on the disc for high quality video recording and playback resolution. Importantly the lens assembly 34 is relatively simple in design and operation, and is consistently smooth running without significant vibration or undue wear of components. The lens assembly 34 is thus uniquely adapted for use in a video recorder-playback machine 10 wherein consistent and accurate focusing of optical beams upon an information disc 14 is a prerequisite for satisfactory video resolution without cross talk between information tracks on the disc.

As shown in FIG. 1, the video recorder-playback machine 10 includes a machine base or table 12 which provides support for a relatively high power laser generator unit 16, such as an argon ion laser, for use in recording a prescribed video infomation signal upon the disc 14. The high power laser generator unit 16 emits a highly amplified collimated beam of light for redirection by a suitable mirror assembly 22 to an electronically driven modulator 24. The modulator 24 is driven by a suitable frequency modulated electronic signal supplied via an input lead 26 wherein the electronic signal is representative of the desired video information. The modulator 24 responds to the electronic signal to interrupt appropriately the amplified beam of light to pass a correspondingly modulated optical signal beam. This resultant optical signal beam is therefore representative of the prescribed video information. Conveniently, in many instances, the electronic signal comprises a composite audio-video signal of the type commonly used in television transmissions and which, when supplied to the modulator 24, yields an optical signal beam representative of the composite audio and video information. However, for sake of clarity and ease of description, all further reference herein will be to video information.

The modulated optical signal beam is incident upon a second mirror assembly 28 for redirection to a mobile optics carriage 30. This optics carriage 30 includes an angularly disposed dichroic mirror 32 for reflection of the optical signal beam in an upward direction for passage through the lens assembly of this invention. The lens assembly 34 carries an objective lens unit 36 including a focusing lens, as will be described in more detail, for focusing the optical signal beam to a precise spot on the underside of the video information disc 14.

The optics carriage 30 is movably positioned by a carriage drive assembly 38 along a path in a radial direction with respect to the disc 14. In this manner, the lens assembly 34 is movably positioned with respect to the disc 14 along a radius of the disc to control the point of focusing of the optical signal beam upon the disc. The carriage drive assembly 38 comprises a precision lead screw 48 supported for rotation by a bracket 50 which can be secured to a frame 40 and to the machine table 12 by a plurality of bolts 42. The lead screw 48 threadably carries a lead screw nut 52 coupled via a nonrotational coupling indicated at 54 to a sleeve-type push block disposed freely about the lead screw 48. As illustrated, this push block 46 is secured to an upright wall 44 of the optics carriage 30.

The lead screw 48 is oriented in a direction generally parallel with the required radial direction of movement of the optics carriage 30. A relatively slow speed reversible motor 56 and a relatively high speed reversible motor 58 are connected to the lead screw 48 through a selective clutch unit 60, and this clutch unit is operated to control reversible driving of the lead screw 48 about its own axis either at a relatively slow or relatively fast speed or rotation.

As illustrated in FIG. 1, the optics carriage 30 is driven by the lead screw 48 in a radially outward direction with respect to the disc 14 whenever the lead screw 48 is rotated to cause the lead screw nut 52 to push against the push block 46. When the lead screw is rotated in an opposite direction, the lead screw nut 52 travels along the screw in an opposite direction. To assure that the optics carriage 30 follows in the opposite, or radially inward direction, the carriage 30 is secured by pins 62 to a linear slide member 64 which is urged with respect to the disc 14 in the radially inward direction by a constant tension band spring 66 wound about a barrel 68 secured to the frame 40. The slide member 64 is slidably mounted on a linear track member 70 secured to the frame 40 and adapted to accommodate linear movement of the optics carriage 30 in both the radially inward and the radially outward directions.

For a more detailed description of the carriage drive assembly 38, see concurrently filed and copending U.S. application Ser. No. 198,696, now U.S. Pat. No. 4,337,538, L entitled DRIVE ASSEMBLY FOR A RECORDER-PLAYBACK MACHINE, which is incorporated by reference herein.

The video information disc 14 is received upon the spindle assembly 18 for relatively high speed rotation of the disc about the vertical axis of the spindle assembly 18 simultaneously with linear movement of the optics carriage 30 in response to operation of the carriage drive assembly 38. More specifically, the disc 14 is vertically supported upon a rotatable drive spindle 72 including an upwardly presented annular shoulder 74 for supporting the disc, and an upper shaft portion 76 received through a central opening 15 in the disc. The drive spindle 72 is carried within an upright spindle housing 78 which is secured to the machine base 12 and supports the spindle 72 for relatively high speed rotation, such as on the order of about 1800 rpm about its vertical axis. A drive motor (not shown) is drivingly coupled to the spindle 72 for rotating the spindle at the relatively high speed of rotation.

For a more detailed description of the spindle assembly 18, see concurrently filed and copending U.S. application Ser. No. 198,695, now U.S. Pat. No. 4,339,814, entitled SPINDLE ASSEMBLY FOR A VIDEO RECORDER-PLAYBACK MACHINE, which is incorporated by reference herein.

In operation, the optical signal beam is focused upon the underside of the video information disc 14 by the radially traversing lens assembly 34 on the optics carriage 30 simultaneously with high speed rotation of the disc. By appropriately controlling the relationship between radial traversal and rotational speed, the optical signal beam is focused upon the disc along a spiraling pattern of closely spaced tracks. Importantly, the disc 14 includes a photo-sensitive coating, such as a layer of thin metal or a photoresist material, adapted to be physically altered by the high power optical signal beam whereby the optical signal beam is physically recorded upon the disc as a pattern of discontinuities representative of the prescribed video information. In practice, the closely spaced tracks are formed to have a width on the order of about 0.5 microns and a center-to-center track spacing of about 1.5 microns.

The clamp assembly 20 is provided for clamping the video information disc 14 securely upon the spindle assembly 18 for accommodating the high speed rotation of the disc without slippage. Importantly, however, the clamp assembly 20 also includes means for centering the disc upon the spindle assembly for accurate high speed rotation of the disc without radial eccentricities with respect to the spindle assembly. While no specific clamp assembly construction is shown or described in detail herein, the preferred clamp assembly construction is set forth in concurrently filed and copending U.S. application Ser. No. 198,694, now U.S. Pat. No. 4,347,599, entitled CLAMP ASSEMBLY FOR A VIDEO RECORDER-PLAYBACK MACHINE, which is incorporated by reference herein.

As illustrated in FIG. 1, a relatively low power laser generator unit 80, such as a helium-neon laser, is mounted directly upon the optics carriage 30 for use in retrieving or playing back the recorded video information from the disc 14. This low power laser generator unit 80 emits an amplified and collimated beam of light for reflection off the disc 14 whereby the reflected optical beam comprises a modulated playback beam which is alternately reflected and nonreflected in accordance with the recorded video information. This modulated playback beam is of sufficiently low power to avoid physical alteration of the photosensitive coating on the disc 14.

The amplified beam of light from the low power laser generator unit 80 is redirected by a suitable mirror assembly 82 on the optics carriage 30 for appropriate incidence upon an angularly oriented mirror 84 which reflects the beam upwardly through the dichroic mirror 32 for focusing upon the disc 14 by the lens assembly 34. The reflected modulated playback beam is returned through the lens assembly 34 and by the mirror 84 to appropriate optical and electronic components 86 for demodulating the playback beam to the form of an electronic signal representative of the prescribed video information. This electronic signal can be supplied to an appropriate video display device, such as a television receiver, for playback of the recorded video information. Importantly, playback can occur independently of the recording function or substantially simultaneously with the recording function to serve as a check of the recording resolution.

Futher details of the optical components of the recorder-playback machine 10 are described in concurrently filed and copending U.S. application Ser. No. 198,693, entitled VIDEO RECORDER-PLAYBACK MACHINE, which is incorporated by reference herein.

The lens assembly 34 of this invention is provided for supporting the objective lens unit 36 for movement toward and away from the information disc 14 in order to maintain a precise focus of the optical beams upon the disc. The lens assembly 34 is responsive to an electrical current signal representative of the difference between the desired distance from the objective lens unit 36 to the disc for precise focusing and the actual distance as a result of surface imperfections in the disc, for electromagnetically adjusting the position of the lens unit 36 to maintain the desired focus. Thus, high quality video resolution is assured without cross talk between the closely spaced tracks on the disc.

The lens assembly 34 is shown in detail in FIGS. 2-5 and comprises the objective lens unit 36 positioned for vertical sliding movement within a lens assembly housing 37. More specifically, the objective lens unit 36 comprises an objective lens casing 39 in which are mounted one or more appropriate optical elements hereinafter referred to as a focusing lens 35 for focusing the vertically directed optical beams upon the video information disc 14. This casing 39 is internally threaded at its lower end for threaded reception of the upper end of a lens holder 41. This lens holder 41 comprises a cylindrical sleeve having an open or hollow interior for unobstructed vertical passage of the optical beams for focusing by the focusing lens 35.

Figure 5:
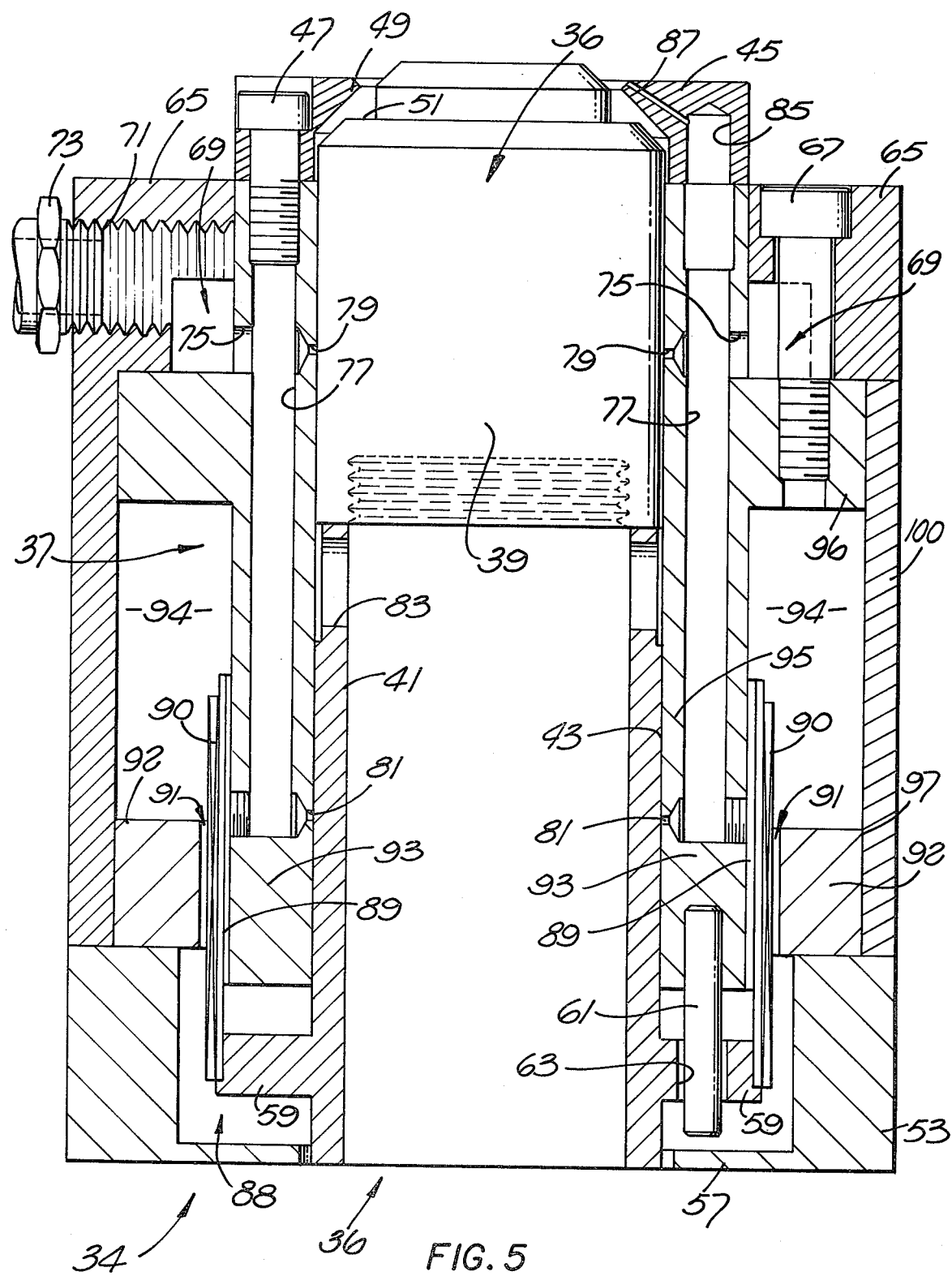
FIG. 5 is an enlarged vertical section taken on the line 5—5 of FIG. 2.

The objective lens casing 39 and the lens holder 41 together define the objective lens unit 36 of substantially common cylindrical shape for close sliding reception within a generally cylindrical bore 43 formed by the lens assembly hosuing 37. The objective lens unit 36 is thus movable slidably within the bore 43 in a vertical direction for movement toward and away from the video information disc. As illustrated in FIG. 5, upward vertical movement is limited by a lens cover 45 secured to the housing 37 by screws 47, and shaped to include a radially inwardly projecting rim 49 for engagement with an upwardly projecting shoulder 51 on the casing 37. Similarly, downward vertical movement is limited by a lower end cover 53 secured to the lower end of the assembly housing 37 by screws 55, and shaped to include a radially inwardly projecting annular seat 57 for engagement with the lower face of an annular radially outwardly projecting flange 59 formed on the lens holder 41. Conveniently, as shown best in FIG. 5, the objective lens unit 36 is secured against rotation within the housing 37 by a vertical dowel pin 61 having one end secured with respect to the housing 37 and its opposite end received relatively loosely through a guide hole 63 in the lens holder flange 59.

A manifold cover 65 is retained in position over the upper end of the lens assembly housing 37 by means of a plurality of screws 67. This manifold cover 65 includes an annular and downwardly presented recess formed therein which, in combination with the assembly housing 37, cooperates to define an annular manifold chamber 69 at the upper end of the housing 37. This manifold chamber 69 is supplied with a pressurized fluid, such as air, via an inlet port 71 adapted to receive a threaded fitting 73 coupled to a source of the pressurized air. The air is in turn communicated from the manifold chamber 69 in a radially inward direction through a plurality of relatively large internal ports 75, which are spaced circumferentially from each other in open communication with respective vertically extending flow risers 77.

The vertical flow risers 77 in the assembly housing 37 each communicate radially inwardly through flow orifices 79 and 81 with the sliding interface between the optical lens unit 36 and the bore 43 of the housing. More specifically, each riser 77 includes at least one upper orifice 79 for passing the pressurized air to the sliding interface between the lens casing 39 and the bore 43, and at least one lower orifice 81 for passing the pressurized air to the sliding interface between the lens holder 41 and the bore 43. In combination, all of the risers 77 pass the pressurized air to the sliding interface for supporting the lens unit 36 with respect to the bore 43 on an air bearing defined by a substantially uniform annular cushion of air. This pressurized air flows upwardly and downwardly along the sliding interface to escape in part at the upper and lower ends of lens unit 36. Another portion of the air escapes through exhaust vents 83, formed about the lens holder 41 generally vertically between the sets of orifices 79 and 81, to allow the air to escape to the hollow interior of the lens holder.

As shown in FIG. 5, one of the flow risers 77 in the assembly housing 37 is aligned vertically with a shallow recess 85 formed in the lower face of the lens cover 45. This recess 85 in turn allows a jet of the air to pass through a jet opening 87 in the lens cover 45 angularly upwardly and radially inwardly across the top of the upwardly exposed focusing lens 35 of the unit. This air jet impinges upon the disc 14 (not shown in FIG. 5) to effectively remove dust and the like from the disc prior to recording or playback of video information to prevent impairment of the video signal, and also creates turbulent air flow over the top of the focusing lens 35 to help prevent accumulation of dust and dirt thereon. Conveniently, as illustrated in FIG. 5, the remaining flow risers 77 are closed and sealed at their upper ends by the screws 47 threaded downwardly therein to secure the lens cover 45 in place.

The flange 59 of the lens holder 41 is positioned within an enlarged annular chamber 88 formed between the lower end of the assembly housing 37 and the seat 57 of the lower end cover 53. The flange 59 is thus allowed to move vertically within the chamber 88 along with the entire objective lens unit 36 supported by the air bearing. Importantly, the flange carries an upstanding and relatively thin cylindrical base 89 disposed generally coaxially with the lens holder 41 and upon which is wound a current conducting coil 90 of copper wire or the like. This coil 90 is connected (not shown), in any suitable and convenient manner to an electrical current having a magnitude representative of the instantaneous distance between the focusing lens 35 and the underside surface of the disc 14, as will be described in more detail.

The cylindrical base 89 and the coil 90 are positioned within a relatively narrow annular air gap 91 also extending generally coaxially about the lens holder 41, and defined by closely spaced pole pieces 92 and 93 of opposite polarity in a magnetic field. These pole pieces 92 and 93 are magnetically coupled with opposite ends of one or more permanent magnets 94 carried by the housing 37 whereby the air gap 91 comprises a portion of a magnetic field. Thus, the coil 90 is positioned within the magnetic field, and a flow of current through the coil results in a vertically directed force upon the coil to shift the position of the optical lens unit 36 including the focusing lens 35 within the assembly housing 37.

The assembly housing 37 forms the pole pieces 92 and 93, and provides a mounting support for the permanent magnets 94. More specifically, the housing 37 comprises a central cylindrical portion 95 of a magnetizable material such as steel and formed to include the bore 43, and an integral upper plate 96 extending radially outwardly for reception of the screws 67 of the manifold cover 65. As illustrated best in FIGS. 3 and 5, a lower radially outwardly extending plate 97 of a magnetizable material is received over the lower end of the cylindrical portion 95, and is secured to the upper plate 96 by a pair of relatively long screws 98 to define the assembly housing 37.

The upper and lower plates 96 and 97 are vertically spaced from each other for reception and containment of a pair of the permanent magnets 94. These magnets 94 are formed from a high flux density permanent magnet material, such as Alnico, and are shaped to include arcuate surfaces 99 for close association with the coil 90 about the circumference of the coil. The two magnets 94 are magnetized with their opposite poles disposed at the upper and lower ends thereof, and are received between the plates 96 and 97 of the housing in the same polar relationship.

The upper plate 96 of the assembly housing 37 forms a flux path extending from the plate 96 downwardly along the cylindrical housing portion 95 to a position concentrically within the coil 90, whereby the upper plate 96 and the cylindrical housing portion 95 of the housing 37 define the pole piece 93. Similarly, the lower plate 97 at the lower ends of the magnets 94 forms the other pole piece 92 concentrically about the coil 90 and spaced from the inner pole piece 92 to define the air gap 91. Accordingly, the assembly housing 37 provides both an air bearing for supporting the optical lens unit 36, as well as the pole pieces 92 and 93 in magnetically coupled association with the magnets 94.

The magnets 94 are contained in position between the plates 96 and 97 by suitable structure enclosing the housing 37. More specifically, the manifold cover 65 projects downwardly along one side of the magnets 94 to enclose one side of the assembly. A side wall 100 is secured between the manifold cover 65 and the lower end cover 53 to enclose the other side of the assembly. End plates (not shown) can be provided for enclosing opposite ends of the assembly, if desired. However, the magnets 94 tend to ramain in magnetically coupled relation with the upper and lower plates 96 and 97, and thus the magnets 94 do not easily shift from their positions.

As described briefly above, an electrical current is coupled to the coil 80 for effecting positional adjustment of the focusing lens 35 of the optical lens unit 36 with respect to the disc 14. This current comprises an electrical signal indicative of the distance between the focusing lens 35 and the disc 14. Thus, the electrical signal, when compared with the desired lens-to-disc distance for precise focusing, represents the lens-to-disc distance, and thus also represents the focusing error of the beam incident upon the disc. Importantly this current varies according to the instantaneous lens-to-disc distance to cause the focusing lens 35 to adjust its position within the air bearing and correct the focusing error. In this manner, the focusing lens unit 35 is maintained at the proper distance from the disc whereby the optical beams are consistently and precisely incident in focus upon the disc.

The electrical current can be obtained by one of several known techniques for obtaining a variable current representative of optical focusing error, whereby the apparatus and method for obtaining this current is not shown or described in detail herein. However, for purposes of illustration, various reflective light intensity comparator systems can be used for determining when the focusing lens 35 is too close or too far away from the disc for precise focusing, and for generating the variable electrical current in response thereto. Examples of such reflective light intensity comparator systems are found in U.S. Pat. Nos. 3,876,841; 3,997,175; and 4,152,586.

The lens assembly 34 of this invention thus provides an assembly housing 37 forming simultaneously an air bearing for supporting an optical lens unit 36 for substantially vibration-free movement with respect to a video information disc, and poles pieces for concentration of magnetic field intensity for use in electromagnetic positional adjustment of the lens unit 36. The lens assembly 34 is thus relatively simple in design and construction, and at the same time provides high quality maintenance of video signal resolution by substantially eliminating focusing error during recording and playback operations. Moreover, the lens assembly 34 is markedly compact in size, allowing it to be positioned close to the rotating information disc for high quality recording and playback resolution.

A variety of modifications and improvements to the lens assembly for a video recorder-playback machine are believed to be apparent to one skilled in the art. Accordingly, no limitation on the invention is intended, except as set forth in the appended claims.

What is claimed is:

1. A lens assembly for focusing an optical beam upon an information storage disc in an information recorder-playback machine, comprising:

an objective lens unit for focusing the optical beam upon the disc; and a housing having a generally cylindrical central bore formed therein, and wherein said lens unit has a generally cylindrical shape for sliding reception within said bore, said housing also including means forming a plurality of passages for communication of a fluid under pressure to the sliding interface between said lens unit and said housing within said bore to accommodate movement of said lens unit generally toward and away from the disc; and wherein:

said means forming a plurality of passages comprises a port receiving a supply of air under pressure, an enlarged annular manifold chamber for receiving pressurized air from said port, a plurality of open flow risers formed in said housing to extend generally in parallel with said lens unit and circumferentially spaced about said lens unit, each of said flow risers being in communication with said manifold chamber and including a plurality of flow orifices spaced along the length thereof for passage of the air under pressure to the sliding interface between said lens unit and said housing within said bore;

each of said flow risers includes at least two of said orifices;

said lens unit includes a hollow portion, having a plurality of exhaust vents formed therein generally between said two orifices of said flow risers for passage of a portion of the pressurized air from the sliding interface through said exhaust vents into said hollow portion; and said housing forms a pair of magnetizable pole pieces disposed with respect to each other to define a relatively narrow air gap; and wherein said lens assembly further inludes:

a magnet positioned for magnetizing said pole pieces to have opposite polarities on opposite sides of said air gap; and a current conducting coil mounted for movement with said lens unit and within said air gap, said coil being for responding to variations in current passing therethrough to apply a force to said lens unit and thereby adjust the position of said lens unit within said housing.

2. The lens assembly of claim 1 wherein said objective lens unit includes a focusing lens.

3. The lens assembly of claim 1 wherein said lens unit comprises a generally cylindrical casing having a focusing lens mounted therein, and a generally cylindrical and hollow lens holder secured to said casing.

4. The lens assembly of claim 1 wherein said housing includes means for limiting movement of said lens unit toward the disc, and means for limiting movement of said lens unit away from the disc.

5. The lens assembly of claim 1 including means for preventing rotation of said lens unit within said bore.

6. The lens assembly of claim 1 including a lens cover secured to said housing and having formed therein a chamber in flow communication with one of said flow risers, and a jet opening in flow communication with said lens cover chamber and oriented for directing a portion of the pressurized air as a jet of air toward the disc to remove dust particles from the disc.

7. The lens assembly of claim 1 wherein said housing includes along a portion of said bore a radially enlarged chamber, and wherein said lens unit includes an annular flange projecting radially into said enlarged chamber, said coil being mounted on said flange to extend generally coaxially with said lens unit.

8. The lens assembly of claim 7 wherein said air gap is formed to extend generally coaxially with said lens unit.

9. The lens assembly of claim 7 including a generally cylindrical coil base mounted on said flange to extend generally coaxially with said lens unit and to project into said air gap, said coil being wound upon said coil base.

10. The lens assembly of claim 7 wherein said housing includes a generally cylindrical portion forming said bore and receiving said lens unit, said enlarged chamber being disposed at one end of said cylindrical portion, an upper plate in magnetically coupled relation with said cylindrical portion, and a lower plate spaced vertically below said upper plate and spaced radially outwardly from said one end of said cylindrical portion to define said air gap; and wherein said magnet is received in magnetically coupled relation between said upper and lower plates and is magnetized with its opposite poles at its upper and lower ends respectively.

11. The lens assembly of claim 10 wherein said means forming said fluid bearing comprises a plurality of passages formed in said cylindrical portion of said housing and including a plurality of vertically spaced orifices for communicating a fluid under pressure from said passages to the sliding interface between said lens unit and said housing within said bore.

12. A lens assembly for focusing an optical beam upon an information storage disc in an information recorder-playback machine, comprising:
a generally cylindrical lens casing having a focusing lens mounted therein;
a generally cylindrical hollow lens holder secured to said casing and sized to have a diameter substantially common to the diameter of said casing, said lens holder including a plurality of circumferentially spaced openings formed therein defining exhaust vents adjacent said casing;
a housing of a magnetizable material including a cylindrical portion defining a central bore for sliding reception of said casing and said holder to accommodate movement of said casing and said holder toward and away from the disc, said cylindrical portion having formed therein a plurality of open flow risers extending generally in parallel with the axis of said cylindrical portion and spaced circumferentially about said cylindrical portion, and a plurality of flow orifices opening radially inwardly from each of said risers to the sliding interface between said casing and holder with said cylindrical portion within said bore, and a first plate extending radially outwardly from said cylindrical portion;
a manifold cover secured to said housing and cooperating therewith to define a manifold chamber in open flow communication with each of said flow risers, and including a port for connection to a supply of air under pressure for flow of the air through said port and into said manifold chamber, and further through said flow risers and said orifices to said sliding interface, a portion of the air exhausting through said exhaust vents;
a second plate of a magnetizable material disposed about one end of said cylindrical portion in radially spaced relation therewith, and in axially spaced relation with said first plate;
magnet means in magnetically coupled relation between said first and second plates for magnetizing said first plate and said cylindrical portion to have one polarity and said second plate to have an opposite polarity whereby said second plate and said cylindrical portion define an annular air gap about said cylindrical portion;
a flange projecting radially outwardly from said lens holder adjacent said one end of said cylindrical portion; and
a current conducting coil assembly mounted on said flange for movement within said lens holder and including a current conducting coil within said air gap, said coil being for responding to variations in current passing therethrough to apply a force to said lens unit and thereby adjust the position of said lens unit within said housing.

13. The lens assembly of claim 12 incuding a lens cover secured to said housing and having formed therein a chamber in flow communication with one of said flow risers, and a jet opening in flow communication with said lens cover chamber and oriented for directing a portion of the pressurized air as a jet of air toward the disc to remove dust particles from the disc.

14. The lens assembly of claim 12 including means for limiting movement of said casing and said holder toward and away from the disc.

15. The lens assembly of claim 12 including means for preventing rotation of said casing and said holder within said bore.

16. A lens assembly for focusing an optical beam upon an information storage disc in an information recorder-playback machine, comprising:
an objective lens unit for focusing the optical beam upon the disc; and
a housing having a generally cylindrical central bore formed therein, and wherein said lens unit has a generally cylindrical shape for sliding reception within said bore, said housing also including means for supporting said lens unit in reciprocating relationship relation to said housing and means forming a plurality of passages for communication of a fluid under pressure to the sliding interface between said lens unit and said housing within said bore to accommodate movement of said lens unit generally toward and away from the disc; and wherein:

said means forming a plurality of passages comprises a port receiving a supply of air under pressure, an enlarged annular manifold chamber for receiving pressurized air from said port, a plurality of open flow risers formed in said housing to extend generally in parallel with said lens unit and circumferentially spaced about said lens unit, each of said flow risers being in communication with said manifold chamber and including a plurality of flow orifices spaced along the length thereof for passage of the air under pressure to the sliding interface between said lens unit and said housing within said bore;

each of said flow risers includes at least two of said orifices;

said lens unit includes a hollow portion, having a plurality of exhaust vents formed therein generally between said two orifices of said flow risers for passage of a portion of the pressurized air from the sliding interface through said exhaust vents into said hollow portion; and means for applying a force to said lens unit and thereby adjusting the position of said lens unit within said housing.

17. The lens assembly of claim 16, including a lens cover secured to said housing and having formed therein a chamber in flow communication with one of said flow risers, and a jet opening in flow communication with said lens cover chamber and oriented for directing a portion of the pressurized air as a jet of air toward the disc to remove dust particles from the disc.

18. The lens assembly of claim 17, wherein said housing incudes along a portion of said bore a radially enlarged chamber, and wherein said lens unit includes an annular flange projecting radially into said enlarged chamber.

19. The lens assembly of claim 18, wherein said housing includes a generally cylindrical portion forming said bore and receiving said lens unit, said enlarged chamber being disposed at one end of said cylindrical portion.

20. The lens assembly of claim 19, wherein said means forming said fluid bearing comprises a plurality of passages formed in said cylindrical portion of said housing and including a plurality of vertically spaced orifices for communicating a fluid under pressure from said passages to the sliding interface between said lens unit and said housing within said bore.

21. A lens assembly for focusing an optical beam upon an information storage disc in an information recorder-playback machine, comprising:

a generally cylindrical lens casing having a focusing lens mounted therein;

a generally cylindrical hollow lens holder secured to said casing and sized to have a diameter substantially common to the diameter of said casing, said lens holder including a plurality of circumferentially spaced openings formed therein defining exhaust vents adjacent said casing;

a housing including a cylindrical portion defining a central bore for sliding reception of said casing and said holder to accommodate movement of said casing and said holder toward and away from the disc, said cylindrical portion having formed therein a plurality of open flow risers extending generally in parallel with the axis of said cylindrical portion and spaced circumferentially about said cylindrical portion, and a plurality of flow orifices opening radially inwardly from each of said risers to the sliding interface between said casing and holder with said cylindrical portion within said bore, and a first plate extending radially outwardly from said cylindrical portion;

a manifold cover secured to said housing and cooperating therewith to define a manifold chamber in open flow communication with each of said flow risers, and including a port for connection to a supply of air under pressure for flow of the air through said port and into said manifold chamber, and further through said flow risers and said orifices to said sliding interface, a portion of the air exhausting through said exhaust vents;

a second plate disposed about one end of said cylindrical portion in radially spaced relation therewith, and in axially spaced relation with said first plate; and means for applying a force to said lens unit and thereby adjusting the position of said lens unit within said housing.

22. The lens assembly of claim 21 including a lens cover secured to said housing and having formed therein a chamber in flow communication with one of said flow risers, and a jet opening in flow communication with said lens cover chamber and oriented for directing a portion of the pressurized air as a jet of air toward the disc to remove dust particles from the disc.

23. The lens assembly of claim 21 inluding means for limiting movement of said casing and said holder toward and away from the disc.

* * * * *